Nov. 22, 1955     D. D'EUSTACHIO     2,724,260
GLASS BLOCK WITH MORTAR REPELLENT COATING
Filed Dec. 6, 1952
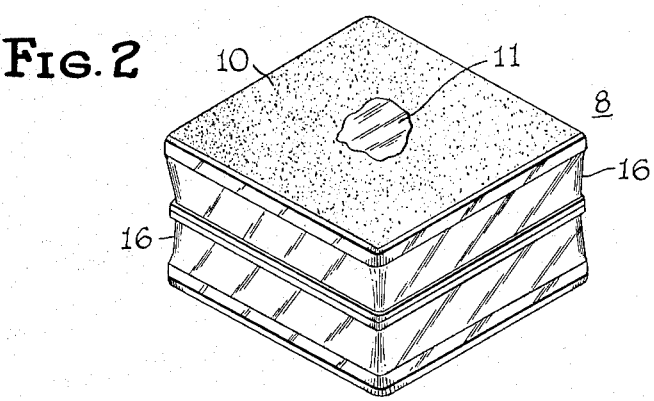
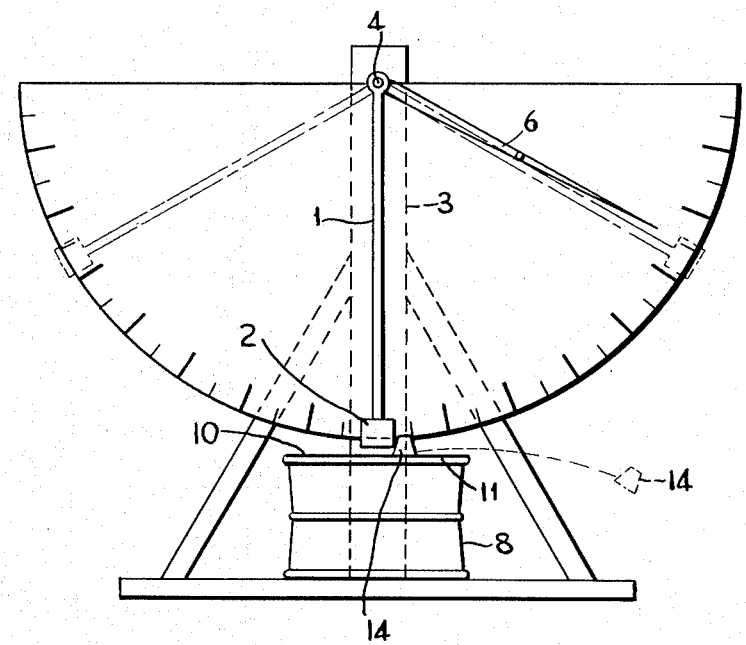
INVENTOR.
DOMINIC D'EUSTACHIO
BY
*Oscar L. Spencer*
ATTORNEY United States Patent Office 2,724,260
Patented Nov. 22, 1955

2,724,260

GLASS BLOCK WITH MORTAR REPELLENT COATING

Dominic D'Eustachio, Port Allegany, Pa., assignor to Pittsburgh Corning Corporation, Allegheny County, Pa., a corporation of Pennsylvania Application December 6, 1952, Serial No. 324,510

8 Claims. (Cl. 72—35)

The present invention relates to a glass building block and it has particular relation to a glass building block having its opposite exterior faces covered with a mortar repellent coating.

In the accompanying drawings which illustrate a preferred embodiment of my invention, Figure 1 is a front elevation of an impact device for testing the adherence of mortar to a glass building block; and Figure 2 is a perspective view of a hollow glass building block according to the invention in which only its opposite exterior faces are covered with a transparent siloxane resinous film to prevent mortar from adhering firmly to said faces, a portion of one of the films being broken away.

In the erection of glass building blocks there is usually a certain amount of mortar which is inadvertently deposited on a face or faces of the block thereby rendering it unsightly. This mortar must be removed in order to present a clean, neat looking wall. If this excess mortar is allowed to remain on the face of the block for any length of time, it is exceedingly difficult to remove.

One method of cleaning excess mortar from a face of a glass block involves the use of a metal bristle brush to scrub or brush the dry mortar from the block face. Such a brush may be in a form of a block held in the hand, mounted on a handle, or a disc mounted on a rotating buffing belt. This method is effective but without some type of face treatment to the blocks, it is time consuming and therefore results in high labor cost. The possibility of damage to the face of the block also exists.

Other methods of mortar removal which have heretofore been utilized include coating the faces of the block with some water soluble material. This method has been found effective in such cases where a sufficiently thick coating was used and the moisture of the mortar did not dissolve the coating before the mortar had set or dried. Such coatings have serious drawbacks, however, since the coating is subject to being rubbed off by handling or being otherwise damaged.

The strong adhesion created between the mortar and the glass block surface is believed to be created by the reaction of the caustic of the mortar with the silicates of the glass. Thus, it is desired to produce a coating on the glass block which will prevent the creation of this bond due to the reaction of the caustic with the glass and at the same time not interfere with the physical properties, such as light transmission, etc., of the glass block.

In accordance with the present invention a glass building block is provided in which the opposite exterior faces of the block are covered with a transparent mortar resistant or mortar repellent siloxane resinous film with the marginal edge surfaces therebetween being free from said film and presenting the only surfaces to which mortar bonds firmly. Those siloxane compounds which have been found to produce a satisfactory mortar resistant coating on a glass block are organopolysiloxanes in which the organic radical is a monovalent hydrocarbon radical and in which there is at least one such monovalent hydrocarbon radical per silicon atom. The monovalent hydrocarbon radicals include alkyl radicals having up to 6 carbon atoms such as methyl, ethyl, propyl, isopropyl, butyl, etc. and aryl radicals such as phenyl and benzyl.

Organopolysiloxanes which have been found to be most satisfactory in the practice of the invention are organopolysiloxanes which contain at least one but less than two monovalent hydrocarbon radicals per silicon atom and up to one alkoxy radical per silicon atom. Alkoxy radicals having up to six carbon atoms such as methoxy, ethoxy, propoxy, isopropoxy, etc. are suitable. It is also to be understood that a small number of the silicon atoms may be bonded together by alkylene, such as methylene and ethylene linkages and polysilane linkages in place of siloxane linkages.

Typical organopolysiloxanes which may be employed are polymers of methyl siloxane, dimethyl siloxane, ethyl siloxane, methyl-ethyl siloxane, methyl-propyl siloxane, methyl-methoxy siloxane, methyl-ethoxy siloxane, methyl-propoxy siloxane, methyl-isopropoxy siloxane, ethyl-methoxy siloxane, etc. The amount of organopolysiloxane coating which is necessary to render a face of a glass block mortar resistant is very small. An amount which will completely cover all portions of the surface with a very thin film is sufficient. In most instances 0.3 cubic centimeters per square foot is sufficient.

The cost of applying these siloxanes will largely determine the type used. Siloxanes in a suitable solution or as an emulsion or vapor may be applied to the faces of the blocks by various methods and at room or elevated temperature. The solvent used, the temperature at which the coating is applied, and the thickness of the coating to be applied in order to produce a mortar resistant coating is determined by the type of organic radical attached to the silicon atoms. It has been found that organopolysiloxane films containing predominantly alkyl radicals usually must be heat cured to render them mortar resistant whereas organopolysiloxane films containing both alkyl and alkoxy radicals are mortar resistant without being heat cured.

In the manufacture of hollow glass building blocks, the two halves thereof are pressed into shape, adhered together, and the assembled block is then annealed. One method of applying a siloxane film in accordance with the present invention is to apply the siloxane as a vapor to the opposite exterior faces of the block at a suitable area in an annealing lehr so that the coating will be baked on the block during the annealing process. When this is done, no further special treatment of the block will be required. As stated above, whether or not it is necessary to heat the siloxane coating to make it mortar resistant, depends upon the particular siloxane which is employed. Some siloxanes require only mild heating to render them mortar resistant whereas others require no heating at all to render them mortar resistant. This is illustrated more clearly in the examples hereinafter set forth.

In each of the examples the mortar resistance of a siloxane coating on a surface of a glass block was measured by a simple pendulum impact test device such as shown in Figure 1.

In that figure, a pendulum impact testing device is shown. A pendulum 1 having a mallet 2 on the end thereof is pivotally supported on a suitable frame support 3 at 4. An angle indicator 6 is mounted on the support 3 so as to show the angle of the rotation of the pendulum from its normal at rest position.

A glass block 8 having a siloxane coating 10 on a face 11 thereof is placed face upward underneath the pendulum so as to intersect the plane of travel of the pendulum and so as to be an inch or so below the bottom point in the path of travel of the mallet 2. A standardized mortar frustrum 14 is cemented on the coated face 11 and the block is positioned with respect to the pendulum so that the frustrum 14 intercepts the mallet at its dead center position.

The mortar resistance of a particular siloxane coating is determined by calculating the decrease in the angle of travel of the pendulum past dead center (starting at an angle of 50 degrees) as a result of the impact required to dislodge a standardized mortar frustrum cemented to the face of the block and allowed to set for about one day.

This decrease is calculated by first measuring the respective angles of travel of the pendulum past deadcenter (the point of contact with the frustrum) after contacting a frustrum which is cemented to the face of the block and after contacting a frustrum which is merely placed upon the surface of the block. The former value is subtracted from the latter value to give the decrease in the angle of travel caused by the adherence of the mortar frustrum to the face coating on the block. A value of less than 2 degrees is considered to be satisfactory and a value greater than 2 degrees is considered to be unsatisfactory.

The following face coatings were applied to a face of a glass block and tested in the manner described above:

Example 1

A glass block was heated to 290° C. and the faces thereof exposed for 10 seconds to vapors of methylpolysiloxane. The block was then subjected to the pendulum impact test and a value of 1.2 degrees was obtained.

Example 2

The two faces of a glass block were sprayed with a 2 per cent by weight solution of dimethylpolysiloxane in carbon tetrachloride and then heated to a temperature of 300° C. for 10 minutes. This glass block was subjected to the pendulum impact test and a value of 1.0 degree was obtained.

Example 3

One face of a 7¾ inch by 7¾ inch glass block was sprayed with 0.1 cubic centimeters of an organopolysiloxane which contained approximately 1.3 methyl radicals per silicon atom and 0.5 isopropoxyl radicals per silicon atom, with the remaining bonds of the silicon atoms being satisfied by siloxane, methylene and polysilane linkages. The glass block was then subjected to the pendulum impact test and a value of 1 degree was measured. No heating of the glass block was required in this test.

Example 4

A glass block was placed in a closed container with water on the bottom of the container and allowed to stand in the container for one-half hour. The face of the glass block was exposed to the vapors of methyl chlorosilane for 30 seconds. Standardized mortar frustrums were then cemented to the face of the block and the frustrums were subjected to the pendulum impact test. The average value of numerous tests was 6.6 degrees.

Example 5

A glass block was exposed to the vapors of methyl chlorosilane as described in Example 1 and the block was then heated at a temperature of 200 degrees F. for 2 hours and 30 minutes. Mortar frustrums were attached to the face of the glass block and subjected to the pendulum impact test. A value of 5 degrees was obtained in this test.

In the above examples, each of the coatings applied to the faces only of the glass blocks rendered them hydrophobic. This was observed by sprinkling water on the coated faces.

Referring to Figure 2, the hollow glass block indicated generally by reference numeral 8 has each of its two opposite exterior faces 11 covered with a transparent organopolysiloxane film 10. The marginal edge surfaces 16 between the faces 11 are free from the film and present the only surfaces to which mortar bonds firmly.

As a result of the present invention the opposite exterior faces of glass blocks have been rendered mortar resistant. If, during construction, any excess mortar should adhere to the face of a glass building block coated with an organopolysiloxane film, it can be easily and completely removed. This can be done by rubbing the block gently with a soft-bristled brush or by any other suitable method without in any way marring the face of the block.

Although the present invention has been described with reference to specific details of certain embodiments thereof, it is not intended that such details shall be regarded as limitations upon the scope of the invention except insofar as included in the accompanying claims.

This application is a continuation in part of my pending application Serial No. 183,908 filed September 8, 1950, entitled "Method of Forming Surface Films on Glass Blocks."

I claim:

1. A glass building block having its opposite exterior faces covered with a transparent organopolysiloxane resinous film with the marginal edge surfaces therebetween being free from said film and presenting the only surfaces to which motar bonds firmly.

2. A glass building block according to claim 1, wherein the organopolysiloxane is an alkyl polysiloxane.

3. A glass building block according to claim 1, wherein the organopolysiloxane film is a methyl polysiloxane.

4. A glass building block according to claim 3, wherein the methyl polysiloxane contains at least one methyl radical per silicon atom.

5. A glass building block according to claim 2, wherein the alkyl polysiloxane contains at least one alkyl radical per silicon atom.

6. A glass building block according to claim 1, wherein the organopolysiloxane contains at least one alkyl radical per silicon atom and at least one alkoxy radical.

7. A glass building block according to claim 1, wherein the organopolysiloxane contains at least one but less than two alkyl radicals per silicon atom and at least one alkoxy radical.

8. A glass building block according to claim 1, wherein the organopolysiloxane contains at least one methyl radical per silicon atom and at least on alkoxy radical.

References Cited in the file of this patent

UNITED STATES PATENTS

| | | |
|---|---|---|
| 1,892,864 | Brassert | Jan. 3, 1933 |
| 2,022,590 | Dziarski | Nov. 26, 1935 |
| 2,110,885 | Lytle | Mar. 15, 1938 |
| 2,294,556 | Henderson | Sept. 1, 1942 |
| 2,574,168 | Brick | Nov. 6, 1951 |
| 2,587,295 | Doyle et al. | Feb. 26, 1952 |
| 2,588,393 | Kauppi | Mar. 11, 1952 |
| 2,620,317 | Johannson | Dec. 12, 1952 |

FOREIGN PATENTS

| | | |
|---|---|---|
| 131,761 | Australia | Mar. 14, 1949 |

OTHER REFERENCES

Dow Corning Silicone Notebook 117–O. S. Fluid Series No. 3 Issues 9/48.